United States Patent Office 3,778,485
Patented Dec. 11, 1973

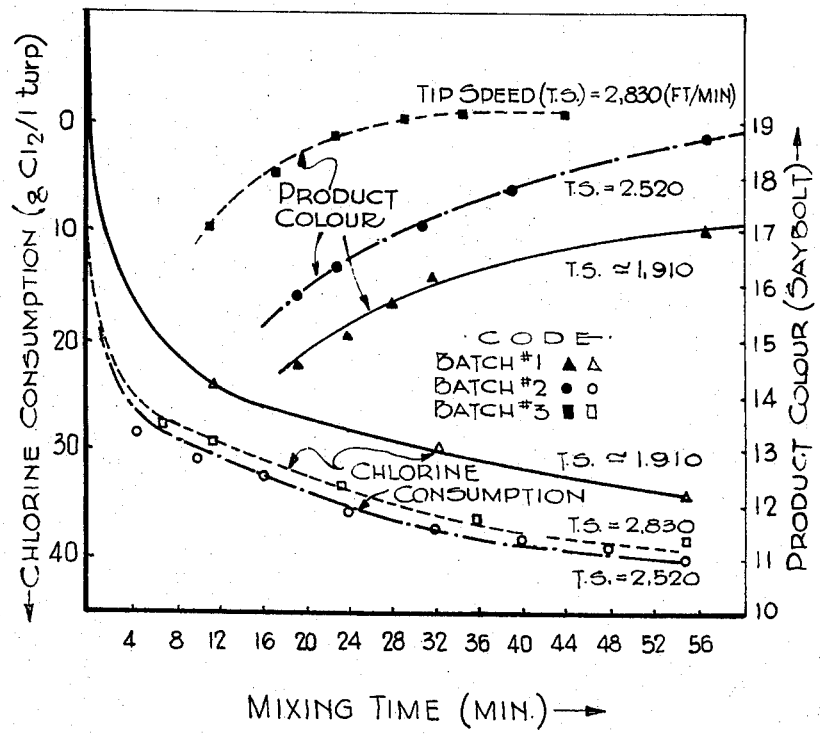

3,778,485
TURPENTINE PURIFICATION PROCESS
Oldrich Prochazka, Ste. Foy, Quebec, Canada, assignor to Anglo Paper Products, Limited, Quebec, Quebec, Canada
Filed Mar. 3, 1972, Ser. No. 231,531
Int. Cl. C09f *3/02*
U.S. Cl. 260—675.5      6 Claims

ABSTRACT OF THE DISCLOSURE

The process of the invention relates to a method of producing solvent grade turpentine by the vigorous agitation of a crude sulfate turpentine, containing malodorous sulfur compounds and/or colored impurities, with an oxidizing hypochlorite solution. This treatment removes the odor-producing sulfur compounds, substantially improves the color of the product, and removes the need for distilling the "light ends." The odor-producing sulfur compounds are converted to water-soluble compounds which are removed in a subsequent washing step in order to prevent the turpentine reverting to its previous malodorous state.

---

This invention relates to a process for the purification of sulfate wood turpentine to produce a solvent grade turpentine.

Crude sulfate turpentine is obtained principally as a product of the manufacture of wood cellulose by the kraft pulping process. It is characterized by a disagreeable odor which is due to the presence therein of various sulfur compounds, such as mercaptans, di- and polysulfides, possibly cyclic sulfur compounds, and possibly some elemental sulfur, which are formed during the wood delignification process. Because of its disagreeable odor and dark color, crude sulfate turpentine has little commercial value in this form except as an important source of terpenes, mostly pinenes.

There are many commercial processes for producing purified sulfate turpentine and these usually consist of two different kinds of treatment: (a) fractional and/or steam distillation, and (b) chemical treatment. A considerable portion of the sulfur-containing impurities can be removed by distillation, since most of these sulfur compounds have lower boiling points than the other constituents of the turpentine. In any event, chemical treatment either before or after the distillation is necessary for complete removal of the sulfur-containing constituents, since small traces of these impurities are capable of imparting a disagreeable odor and undesired color to the turpentine.

The following methods, which employ chemical or semi-chemical procedures, have been used in attempts to purify crude sulfate turpentine, but all have been unsuccessful for technological and/or economic reasons unless preceded or followed by distillation procedures, (1) aeration (hot or cold);
(2) treatment with sulfuric acid;
(3) treatment with oxidizing agents;
(4) treatment with ethylenediamine;
(5) treatment with alkali;
(6) treatment with metal salts to precipitate the impurities, and
(7) selective extraction with furan derivatives.

In some cases, the incomplete removal of the sulfur impurities resulted in the product reverting to its malodorous state after storage for a short period of time.

U.S. Pat. No. 1,439,454 (November 1920, Jobson); 2,283,067 (November 1939, Jennings); 2,395,055 (September 1942, Lorand); 2,409,614 (January 1942, Collins), and 2,459,570 (June 1947, McGregor) are examples of earlier patents which disclose such chemical and semi-chemical procedures, followed or preceded by distillation procedures.

It is an object of the present invention to provide a simple, low-cost process for converting crude sulfate turpentine into an acceptable commercial product.

It is a further object of the present invention to provide a one-stage process for converting crude sulfate turpentine into an acceptable commercial product, said process comprising a chemical bleaching step and a washing step, thus eliminating the distillation procedure of the prior art.

The process of the present invention involves the use of a chemical treatment step; which may be repeated if necessary, followed by a washing step. The chemical treatment step comprises dispersing, as thoroughly as possible, a hydrochlorite bleach solution into the crude sulfate turpentine through vigorous mixing. The improvement in this process over prior processes lies not in the selection of the chemical bleach but in the intense mixing and in the use of only this chemical procedure without the need of any distillation procedure.

Hypochlorite solutions of the alkali metal and alkaline earth metals, such as sodium, potassium, calcium and magnesium, are used as the bleach solutions. For economic reasons, sodium and calcium hypochlorite solutions are preferred for the process according to the invention.

The crude sulfate turpentine and the hypochlorite solutions used in this process have different specific gravities and are immiscible. Thus the highly efficient dispersion of the reagents by vigorous mechanical agitation is a most important factor for removing the malodor from, and improving the color of, the turpentine. The efficient dispersion of both liquids is necessary since the desired results are best achieved when each molecule of impurity has been oxidized by the hypochlorine solution. The oxidation process converts the malodorous sulfur compounds into water-soluble products which are removed in the subsequent washing step, thus resulting in the complete removal of the malodor, substantial color improvement, and the elimination of any need to distill the "light ends" which is the fraction boiling below about 150° C. and consisting mostly of sulfur compounds, principally methyl mercaptan. The washing step also removes traces of the bleach solution. The amount of washing depends on the product quality required for different end uses of the turpentine, but is usually carried out until the pH of the waste wash water is near neutrality.

The invention will be described in more detail hereafter and with reference to a single figure of drawings which is useful in describing the beneficial effects of the invention.

In the process according to the present invention the hypochlorite solution and the crude turpentine are preferably mixed in a reaction volume ratio of 1:1. However, any volume ratio may be used that permits sufficient contact between the two solutions for the economic removal of the sulfur-containing impurities.

Volume ratios from 0.1 to 10:1, hypochlorite to turpentine, have been successfully used for color improvement in turpentine, the lower ratios being used with previously bleached turpentines containing unoxidized, colored, residual impurities and the higher ratios being used with crude turpentines containing large amounts of colored impurities.

For each litre of crude sulfate turpentine having a sulfur content of 0.2 to 0.3% (calculated as elementary sulfur), a hypochlorite bleach charge of 45 to 50 g. of active chlorine is usually required for successful purification. Naturally, varying amounts of bleach charge will be required for turpentines of different origins and having differing amounts of impurities. Too low a bleach charge results in poor color improvement, while too high a charge results in a product that has an undersirable gold-yellow color which is probably due to the formation of chlorinated terpenes.

A reaction temperature of from about 30° C. to 75° C. has been found to be most suitable for the process according to the invention. Higher temperatures are economically undesirable due to increased energy consumption, the need for more complex equipment, and product loss due to vaporization of turpentine when a reflux condenser is not used. Higher temperatures also favor side reactions and the formation of undesirable contaminants. Lower temperatures may be used but these result in an undue, uneconomical prolongation of the mixing process.

For the hypocholrite purification process according to the invention, a pH range of from about 9.0 to 12.5 is preferred. A higher pH may be used but it will result in a prolonged reaction time. The pH of the reaction solution will depend upon the active chlorine content ($\simeq$30 to 50 g.p.l. for the pH range mentioned above) of the hypochlorite solution and the alkalinity (excess of NaOH, $Na_2CO_3$ or $NaHCO_3$) thereof that is required for its stabilization.

Although the volume ratio of reactants, the reaction temperature, and the pH of the reaction mixture may vary quite widely as noted hereinbefore, a highly efficient dispersion of the reagents through vigorous, mechanical agitation is necessary for complete malodor removal from and substantial color improvement in the turpentine.

In carrying out the process according to the invention a high shear turbine impeller was used, but any other method that would produce a similar intense mixing would be suitable. An indication of the mixing intensity is the peripheral linear velocity of the tips of the impeller blades. This is especially relevant when dealing with a fixed situation in which only the impeller rotational speed, and hence the tip speed (T.S.), is changing, but would also be applicable in any mixing situation in which an impeller is used. A text on mixing technology, "Liquid Mixing and Processing in Stirred Tanks" by F. A. Holland and F. S. Chapman, Reinhold Publishing Corporation, New York, 1966, lists the following as the usual ranges of turbine impeller tip speed for various degrees of agitation used in industry, Agitation: Tip speed (ft. min.)
Low _____ 500–650
Medium _____ 650–800
High _____ 800–1100

Tip speeds of as high as 2800 ft./min. and greater were found desirable in carrying out the process of the invention.

Agitator "Tip speed" in ft./min. is commonly used as a measure of the degree of agitation in a liquid mixing system. It is defined as follows:

Tip speed $(T.S.) = \pi Da \times r.p.m.$ where $Da$ is the diameter of the agitator in feet and r.p.m. is the rotational speed of the agitator in revolutions per minute.

The beneficial effect of agitation on the time needed to complete the process has been shown in batch bleaching runs carried out on a large scale. The reaction conditions, mixing data, and the equipment used in three such batch runs are tabulated as follows:

(A) CONDITIONS (a) Turpentine to hypochlorite solution ratio=1:1
(b) Bleach charge (g. $Cl_2$/l. turpentine)=45
(c) Hypochlorite concentration (g.p.l. active $Cl_2$)=45–50
(d) Mixing temperature (° C.)=45–65
(e) Mixing time=0–55 minutes
(f) pH=12.5–12.0

(B) MIXING DATA (a) Speed of agitator (r.p.m.)=540 (B#3), 485 (B#2), 260–485 (B#1)
(b) Liquid diameter=60″
(c) Liquid level height=33½″ (B#2 and #3), 66″ (B#1)
(d) Impeller bottom clearance=20″

(C) PROCESS EQUIPMENT USED (a) Mixing tank—60″ diameter, 9½′ in height, mild steel, open, equipped with four (4) vertical baffles (width =5″) spaced at 90° intervals; conical bottom 9″ depth.

(b) Agitator.—Vertically mounted at the centre of tank, belt driven at reduced speed by (20 HP, 1,700 r.p.m., 21 amps, 550 v., 3 pH.) electric motor. Steady bearing was used.

(c) Impeller used.—20″ diameter chemshear (6 blades) put on a shaft 8½′ long (bottom clearance=20″ and 40″ from apex of the cone).

The figure of drawings and the following Table I show the effect of various agitation speeds as investigated in these three batch runs.

TABLE I.—THE EFFECT OF VARIOUS AGITATION SPEEDS

| Batch No. | Reaction volume (I.G.)[1] | Dia. (inch) | Impeller T.S. (ft./min.) | Number employed | Agitator energy consumption | | Color of product of invention (Saybolt)[3] |
|---|---|---|---|---|---|---|---|
| | | | | | Full loaded (amps) | Reaction time (min.) | |
| 3 | 360 | 20 | 2,830 | 1 | [2] 20–22 (12–14) | 24 | 19 |
| 2 | 360 | 20 | 2,520 | 1 | 15–16 | 55 | 19° |
| 1 | 630 | 20 | 1,910 | 2 | 16–25 | 55 | 16°–17° |

[1] Imperial gallon.
[2] Unloaded agitator.
[3] According to A.S.T.M. Standard D 223-65, a product color of 11°–19° (Saybolt) is acceptable for market distribution; however, a color of 17°–19° (Saybolt) is preferred and required by turpentine distributors.

From the results shown in Table I and the figure of drawings, it appears that varying the speed of agitation has a pronounced effect on the reaction time and the color of the reaction product. For example, the increase of agitation from 2,520 ft./min. tip speed to 2,830 ft./min. tip speed resulted in a decrease of reaction time from 55 minutes to 24 minutes to achieve the same maximum removal of color from the product. A much lower color improvement was obtained for agitation at 1,910 ft./min. tip speed. Very poor color improvement (11°–13° Saybolt) was found in other trial runs for moderate agitation in the range of 500–600 ft./min. tip speed, even after a 6 to 8 hour mixing period and under otherwise identical conditions.

The time needed to complete the bleaching process depends upon the temperature of the mixture and the degree of intense mixing and, as illustrated in the figure of drawings, may vary from about 15 minutes to an hour or more.

The following examples describe trials made in a laboratory pilot plant using a small 30 I.G. tank and are illustrative of the process of purifying crude sulfate turpentine according to the invention.

EXAMPLE I

A sodium hypochlorite solution having 90 g.p.l. available chlorine was diluted with hot water to a concentration of 45 g.p.l. available chlorine. The final temperature of the hypochlorite solution was about 40–45° C.

Step 1.—Bleaching

Five gallons (imperial) of crude sulfate turpentine and 5 gallons (imperial) of the hypochlorite solution prepared as described above were pumped simultaneously into the mixing tank. The reaction mixture was then vigorously agitated for a period of about 25 minutes, during which time the temperature was increased from 30° to 75° C.

Step 2.—Washing

After the residual hypochlorite solution was drained off, an equivalent volume of water was added to the turpentine. This mixture was agitated, then allowed to separate and the water layer was drained off.

Step 3.—Additional washing

Washing the turpentine with fresh water was repeated until the wash water showed a neutral pH.

EXAMPLE II

Bleaching was carried out on a crude sulfate turpentine in the manner set out in Step 1 of Example I. The product obtained had a light brown color. After the residual hypochlorite solution from Step 1 has been drained off, a fresh volume of sodium hypochlorite solution (0.5 gal.) was added so that the volume ratio of hypochlorite to turpentine was 0.1. The mixture was agitated vigorously for about 5 minutes, then allowed to separate. Washing with water was carried out as in Steps 2 and 3 of Example I.

For each of Examples I and II the product yield was 95% (based on crude). The product was straw-yellowish in color with the characteristic odor of wood turpentine. The physical properties of the product corresponded closely in boiling point, specific gravity and refractive index with those of the best commercial grades of turpentine (see Table II). The improvement in turpentine quality, without subsequent degradation, is illustrated by Table III.

TABLE II.—PHYSICAL PROPERTIES

| | ASTM spec, Min. | ASTM spec, Max. | Crude turpentine | Bleached turpentine of invention |
|---|---|---|---|---|
| Specific gravity (15.5° C.) | 0.860 | 0.875 | 0.865 | 0.866 |
| Refractive index (20° C.) | 1.465 | 1.476 | 1.469 | 1.466 |
| Initial boiling point (° C.) | 150 | 160 | 70 | 153 |
| Distilling below 170° C. (percent) | 90 | | | 91.4 |
| Color (Saybolt) standard | 11° | 19° | (¹) | 18°–19° |

¹ Dark brown.

TABLE III.—COMPOSITION OF BLEACHED TURPENTINE

| GLC ¹ analysis | Crude turpentine, percent | Bleached turpentine of invention, percent |
|---|---|---|
| Lights | 0.4–3.0 | |
| α-Pinene | 71.5–78.0 | 76.4 |
| Camphene | 0.7–1.4 | 1.3 |
| β-Pinene | 10.7–13.8 | 13.8 |
| Myrcene | 0.3–2.4 | 2.2 |
| Dipentene | 3.2 | 3.6 |
| Pine oil | 2.8 | 2.0 |
| Heavies | 0.0–3.9 | 0.6 |
| Unknown | | |
| Sulfur (wt./vol., percent) | 0.21–0.30 | 0.014 |
| Chloride (wt./vol., percent) | 0.003 | 0.092 |

¹ Gas-Liquid Chromatography.

The conditions described in the figure of drawings, Tables I, II and III, and Examples I and II are illustrative only of typical conditions and are not intended to define or limit the process conditions, since intense agitation of the reaction mixture could be used to improve the turpentine product obtained with the use of oxidizing agents other than hypochlorites.

I claim:

1. A process for treating crude sulfate turpentine containing a fraction boiling below 150° C. with an oxidizing solution to remove the malodor therefrom, to improve its color, and to eliminate the need of distilling therefrom the fraction boiling below 150° C., which comprises intensely mixing said crude sulfate turpentine with an oxidizing solution selected from the group consisting of alkali metal and alkaline earth metal hypochlorite solutions to obtain a shear equivalent to that achieved through use of an impeller with an agitator tip speed greater than 1100 ft./min., thereafter separating the resulting liquid phases, and washing the turpentine phase with water.

2. The process of claim 1 wherein the hypochlorite solution and the crude sulfate turpentine are mixed in a reaction volume ratio of 0.1 to 10:1 hypochlorite to turpentine.

3. The process of claim 1 wherein an amount of hypochlorite solution containing about 30 to 50 g. of active chlorine is used per litre of crude sulfate turpentine.

4. The process of claim 1 carried out within the temperature range of about 30° C. to 75° C.

5. The process of claim 1 wherein the pH of the reaction mixture falls within the range of from about 9.0 to 12.5.

6. The process defined in claim 1 wherein the turpentine and the oxidizing solution are intensely mixed through use of a high shear turbine impeller with an agitator tip speed greater than 1910 ft./min.

References Cited

UNITED STATES PATENTS

| | | | |
|---|---|---|---|
| 1,493,454 | 5/1924 | Jobson | 260—675.5 |
| 2,283,067 | 5/1942 | Jennings | 260—675.5 |
| 2,395,055 | 2/1946 | Lorand | 260—675.5 |
| 2,409,614 | 10/1946 | Collins | 260—675.5 |
| 2,459,570 | 1/1949 | McGregor | 260—675.5 |
| 3,660,512 | 5/1972 | Hamby et al. | 260—675.5 |

DELBERT E. GANTZ, Primary Examiner

G. E. SCHMITKONS, Assistant Examiner

U.S. Cl. X.R.

208—190, 255, 298